Jan. 11, 1949. H. P. ANDRESEN 2,458,922
CASTER
Filed Sept. 27, 1944
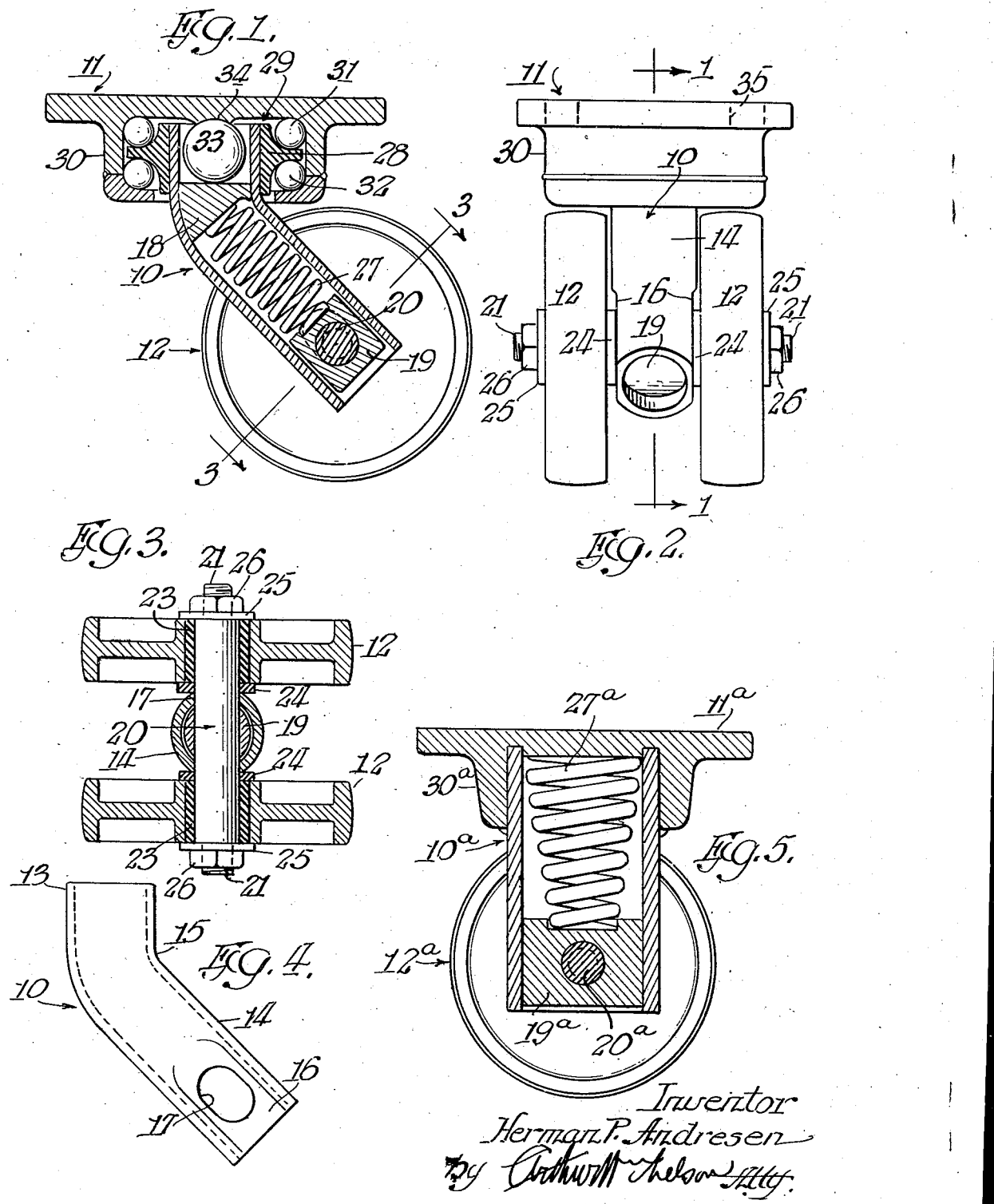
Inventor
Herman P. Andresen Patented Jan. 11, 1949

2,458,922

UNITED STATES PATENT OFFICE 2,458,922

CASTER

Herman P. Andresen, Chicago, Ill.; Ella Veil Andresen, executrix of said Herman P. Andresen, deceased, assignor of one-fourth to Ella Veil Andresen, one-fourth to Amanda M. C. Andresen, one-fourth to Edward W. H. Andresen, and one-fourth to Elsa C. M. Dettmer, as tenants in common Application September 27, 1944, Serial No. 555,906

5 Claims. (Cl. 16—44)

This invention relates to improvements in casters used on hand trucks, dollies and other industrial equipment and it consists of the matters hereinafter described and more particularly pointed out in the appended claims. Such casters are of the swivelling and of the non-swivelling type and the present invention is of advantage in both types of casters.

One of the objects of the present invention is to provide in a caster of this kind, a simple and efficient construction which provides a cushion action between the top plate and wheel to absorb shocks that would otherwise be transferred to the load carried by the truck or the like, to which the casters are attached, due to the unevenness of the surface over which the wheels of the caster may roll.

Another object of the invention is to provide a caster of this kind, having a cushion action that is so built into the caster as to be fully protected against damage or the possibility of picking up strings and thread and other foreign matter from the surface over which the caster may roll.

Also, it is an object of the invention to provide a caster wherein the wheels are capable of a limited lateral tilting better to maintain contact with an uneven surface and thereby prevent damage to the equipment from upsetting, due to such surface.

Again, it is an object of the invention to provide a caster of this kind which has a safety factor in load capacity and which rolls easily over sharp door sills, onto and off of freight elevators when slightly out of floor position and such other obstructions that tend to produce shocks as the wheels of the caster pass over the same.

The above mentioned objects of the invention, as well as others, together with the advantages thereof will more fully appear as the specification proceeds.

In the drawing:

Fig. 1 is a vertical sectional view through a caster of the swivelling type embodying one form of the invention, the plane of the section being indicated by the line 1—1 of Fig. 2.

Fig. 2 is a view in rear elevation of the caster appearing in Fig. 1.

Fig. 3 is a horizontal sectional view through a part of the caster shown in Fig. 1, as taken on the line 3—3 thereof.

Fig. 4 is a view in side elevation of a certain tubular frame or post embodied in caster shown in Fig. 1 and which will be more fully referred to later.

Fig. 5 is a veiw similar to Fig. 1 showing the improved structure as embodied in a non-swivelling type of caster.

In general the improved caster, whether of the swivelling or non-swivelling type, includes laterally spaced wheels that are journalled upon the ends of an axle that extends through elongated openings in both sides of the bottom end of a tubular post that functions as the frame of the caster. The upper end of the post is operatively connected to the top plate of the caster and by which the caster as a whole is attached to a truck, dolly or other piece of industrial equipment which it is desired to make mobile.

A mid portion of the axle passes through a crosshead positioned in the lower end of the post. This cross head so fits in said end of the post as to have a movement in the direction of the openings mentioned, as well as some lateral tilting in the post as afforded but limited by its fit within the post. Resilient means, such as a helical spring, is arranged within the tubular post and engages at one end against said crosshead and engages at its other end against a part fixed with respect to the tubular post. With the arrangement mentioned, the shock imposed upon the caster, due to the rolling of the wheels over an uneven surface or obstruction on said surface is transferred first to the crosshead and then to the spring to prevent the transmission of such shock to the truck of which the casters form a part.

Referring now in detail to that embodiment of the invention in a caster of the swivelling type, illustrated in Figs. 1 to 4 inclusive of the drawing, said caster includes primarily three main parts which are the frame 10, the top plate 11 and the wheels 12—12.

The frame in this instance is made in the form of a tubular post that has an upright top end portion 13 and an angularly downwardly extending bottom end portion 14 which is joined to the top end portion by a curved knee 15. Preferably this post is made from a piece of seamless tubing. Opposite sides of the portion 14, toward the extremity thereof, are flattened as at 16 and in said flattened sides are registering longitudinally extending elongated openings 17—17. The construction of the post 10 best appears in Fig. 4.

In the knee of the post is operatively secured a plug 18, the flat top surface of which is spaced inwardly from the top end edge of the post portion 13, the bottom surface of said plug also being flat but formed to be disposed at a right angle to the axis of the post portion 14.

In the bottom end portion of the post in the vicinity of the slots 17—17 is located a relatively short cylindrical cross head 19, of such diameter as to provide a clearance between said head and post. This clearance permits an easy movement of the crosshead longitudinally of and a limited lateral or rocking motion in said post portion.

An axle 20 extends transversely through said cross head and end portions of said axle extend through the slots 17—17. Each end portion has a threaded extremity 21 of reduced diameter. A wheel 12 is journalled on a bushing 23 on said end portion. Each bushing, which is preferably made of so-called "Oilite" bearing metal, is confined in place by inner and outer washers 24 and 25 respectively. The inner washer for each bushing engages flatwise against an associated flattened side or face 16 of the post. A nut 26 threaded on an associated extremity 21 engages an associated washer 25 and holds the same in place. With the arrangement described, the axle is not only held in place in the post, but the wheels are also held in place upon the axle.

A resilient means 27 (see Fig. 1) is disposed in the post portion 14 so as to engage at one end against the plug 18 and at the other end against the crosshead 19.

On the top end portion 13 of the post is fixed a collar 28 formed to provide upper and lower raceways. This collar is disposed in a recess 29 formed in a part 30 depending from the plate 11 and certain surfaces, which form upper and lower raceways, coact with the raceways of the collar to accommodate an upper row of main or direct thrust receiving balls 31 and a lower row of secondary or component thrust receiving balls 32, said rows of balls being of the same diameter. A center bearing ball 33 is disposed axially in the end 13 of the post and bears at one side on the plug 18 and at the other side in a shallow recess 34 disposed axially of the underside of the plate 11.

The structure just above described, provides an antifriction swivel connection for the upper end of the post with the plate and about which the post may turn axially without separation under the action of the wheels 12, the axis of which is offset from the axis of the swivel connection. Thus in the movement of the truck equipped with such casters, the post swivels about the axis of the post portion 13 so that said wheels track or trail in the direction of movement of the truck.

In such movement of the truck should the wheels engage a depression or an obstruction, the shock imparted to the wheels is transferred to and absorbed by the spring 27 so that it is not transmitted to the load carried by the truck. Also because of the clearance before mentioned, between the crosshead and associated post portion along with the elongated openings, said crosshead may rock laterally to a limited extent when only one wheel is affected by the uneven surface over which said wheels roll.

When a vehicle equipped with casters such as shown in Fig. 1 is carrying a load and is being moved about upon a supporting surface, the wheels of said casters trail in the direction of the movement of the vehicle. Under such conditions the springs 27 in the post 10 of said casters are somewhat compressed and the associated axles 20 of said casters are spaced a short distance from the bottom end of the slots 17 in said posts 10—10. As a consequence thereof, should the wheel of any one caster strike an obstruction on said surface upon which it is rolling, the compression of the spring of that caster is decreased and there is a momentary expansion or lengthening of the spring and then a return to its previously compressed condition. Thus the spring of that caster is not subjected to a maximum compressive stress and shock simultaneously and therefore breakage of the spring is eliminated so that it has a longer period of usefulness.

In Fig. 5 is illustrated a non-swivelling type of caster embodying the invention. In said Figure the post, which is indicated at 10a, is a straight upright tubular one having its upper end rigidly fixed in a depending part 30a of the plate 11a. The wheels 12a—12a are mounted on an axle 20a as before, and which axle passes through a crosshead 19a disposed in the bottom end of the post. A spring 27a is confined in the post between the top end of said crosshead and a central bottom surface portion of the top plate. The cushioning action of the structure described is the same as before described, and wherein the spring 27a absorbs the shock imposed upon the caster. Of course, the top plate of the caster of both types described is provided with suitable openings 35 to accommodate the bolts by which the caster is attached to a truck or dolly or the like. The openings appear in dotted lines only in Fig. 2.

The improved caster construction absorbs shocks imparted to the wheels and prevents the transmission thereof to the load carried by the truck or dolly, to which the caster is attached. The resilient means mentioned is contained within the post and protected thereby and nothing appears upon the outside of the caster to indiacte its shock absorbing qualities.

While in describing the invention I have referred in detail to the form, arrangement and construction of the parts making up the caster, the same is to be considered only in the illustrative sense so that I do not wish to be limited thereto except as may be specifically set forth in the appended claims.

I claim as my invention:

1. A caster embodying therein a top plate, a post having a vertical upper end and an angularly disposed tubular lower end, means providing a swivel connection for the upper end of said post with said plate, a member arranged in the lower end of the post for a limited guided movement longitudinally thereof, laterally extending axle portions movable with said member, a wheel journalled on each axle portion, and means in said lower end of the post for cushioning the limited movement of said member under the action of shock imposed upon the caster.

2. A caster embodying therein a top plate, a post having a vertical upper end and an angularly disposed tubular lower end, means providing a swivel connection for the upper end of the post with said plate, a member arranged in the lower end of the post for a limited guided movement longitudinally thereof, an axle extending laterally through said member and having portions projecting laterally from opposite sides of said member and extending through elongated openings in associated sides of the lower end of said post, a wheel at each side of the lower end of the post and journalled on an associated axle portion, means providing a shoulder in the upper part of said tubular lower end of said post, and means in said lower end of the post and engaged with said member and said shoulder respectively for cushioning the movement of said member under the action of shock imposed upon the caster.

3. A caster embodying therein a top plate, a tubular post having a vertical upper end and an angularly disposed lower end, means providing a swivel connection for the upper end of the post with said plate, a plug at the junction of said upper and lower ends of the post, a member arranged in the lower end of the post for a limited guided movement longitudinally thereof, an axle extending laterally through said member and through elongated openings in opposite sides of the post and having end portions projecting laterally therebeyond, a wheel journalled on each axle portion, and resilient means in said lower end of the post and engaged with said member and said plug respectively for cushioning the movement of the same under the action of shock imposed upon the caster.

4. A caster embodying therein a top plate, a tubular post having a vertical upper end and an angularly disposed lower end, connected together by a curved portion, means providing a swivel connection for the upper end of said post with said plate, a member arranged in the lower end of the post for a limited guided movement longitudinally thereof, axle portions projecting laterally from opposite sides of said member and extending through elongated openings in associated sides of the lower end of said post, a wheel at each side of the lower end of the post and journalled on an associated axle portion, means providing a plug in said curved portion of the post and there forming an abutment in said post in spaced relation from said member, and resilient means in said post between said abutment and said member for cushioning the movement of the latter under the action of the load imposed upon the caster.

5. A swivelling caster embodying therein a top plate, a tubular post having a vertical upper end portion and an angularly disposed lower end portion, means providing a swivel connection for the upper end portion of the post with said top plate, a member arranged in the lower end portion of the post for a limited guided movement longitudinally thereof and a limited lateral movement therein, an axle extending laterally through said member and through longitudinal openings in opposite sides of said lower end portion of the post and having end portions projecting therebeyond, a wheel journalled on each axle portion, resilient means arranged in said lower end portion of the post and engaged at one end with said member, and means providing an abutment in said post and spaced longitudinally from said member and with which the other end of said resilient means is operatively engaged.

HERMAN P. ANDRESEN.

REFERENCES CITED

The following references are of record in the file of this patent:

UNITED STATES PATENTS

| Number | Name | Date |
| --- | --- | --- |
| 326,224 | Kefuss | Sept. 15, 1885 |
| 968,790 | Olsen | Aug. 30, 1910 |
| 1,527,239 | Vaughan et al. | Feb. 24, 1927 |
| 1,727,716 | Kassler et al. | Sept. 10, 1929 |
| 1,979,378 | Gannett | Nov. 6, 1934 |
| 2,096,239 | Geyer | Oct. 19, 1937 |